US012800988B2

(12) United States Patent
Cheng et al.

(10) Patent No.: US 12,800,988 B2
(45) Date of Patent: Nov. 17, 2026

(54) OPTICAL ELEMENT DRIVING MECHANISM

(71) Applicant: TDK Corporation, Tokyo (JP)

(72) Inventors: Pai-Jui Cheng, Taoyuan City (TW); Shu-Shan Chen, Taoyuan City (TW); Chuan-Min Lee, Taoyuan City (TW)

(73) Assignee: TDK Corporation, Tokyo (JP)

(*) Notice: Subject to any disclaimer, the term of this patent is extended or adjusted under 35 U.S.C. 154(b) by 73 days.

(21) Appl. No.: 19/016,155

(22) Filed: Jan. 10, 2025

(65) Prior Publication Data

US 2025/0231463 A1 Jul. 17, 2025

Related U.S. Application Data

(60) Provisional application No. 63/619,916, filed on Jan. 11, 2024.

(51) Int. Cl.

| | |
|---|---|
| ***G03B 5/00*** | (2021.01) |
| ***G02B 7/08*** | (2021.01) |
| ***G02B 7/09*** | (2021.01) |
| ***G02B 13/00*** | (2006.01) |
| ***G02B 27/64*** | (2006.01) |
| ***G03B 13/36*** | (2021.01) |
| ***G03B 30/00*** | (2021.01) |
| ***H02N 2/02*** | (2006.01) |
| ***H02N 2/04*** | (2006.01) |
| ***H02N 2/06*** | (2006.01) |
| ***H04N 23/51*** | (2023.01) |
| ***H04N 23/54*** | (2023.01) |
| ***H04N 23/55*** | (2023.01) |
| ***H04N 23/57*** | (2023.01) |

(52) U.S. Cl.
CPC ................ *G03B 5/00* (2013.01); *G02B 7/08* (2013.01); *G02B 7/09* (2013.01); *G02B 13/001* (2013.01); *G02B 27/64* (2013.01); *G03B 13/36* (2013.01); *G03B 30/00* (2021.01); *H02N 2/025* (2013.01); *H02N 2/04* (2013.01); *H02N 2/062* (2013.01); *H04N 23/51* (2023.01); *H04N 23/54* (2023.01); *H04N 23/55* (2023.01); *H04N 23/57* (2023.01); *G03B 2205/0061* (2013.01)

(58) Field of Classification Search
CPC ........ H04N 23/51; H04N 23/54; H04N 23/55; H04N 23/57; G03B 5/00; G03B 13/36; G03B 17/02; G03B 30/00; G03B 2205/0061; G02B 7/08; G02B 7/09; G02B 13/001; G02B 27/64; H02N 2/025; H02N 2/04; H02N 2/062; H04M 1/0264; G06F 1/1686
See application file for complete search history.

(56) References Cited

U.S. PATENT DOCUMENTS

2006/0215283 A1* 9/2006 Makii .................... G02B 7/023 359/824
2023/0266579 A1* 8/2023 Chen ...................... G02B 26/02 359/601

* cited by examiner

*Primary Examiner* — Twyler L Haskins
*Assistant Examiner* — Akshay Trehan
(74) *Attorney, Agent, or Firm* — MUNCY, GEISSLER, OLDS & LOWE, P.C.

(57) ABSTRACT

An optical element driving mechanism is provided. The optical element driving mechanism includes a movable part, a fixed part, and a driving assembly. The movable part is connected to an optical element. The movable part is movable relative to the fixed part. The driving assembly drives the movable part to move along a first direction.

19 Claims, 8 Drawing Sheets

OPTICAL ELEMENT DRIVING MECHANISM

CROSS REFERENCE TO RELATED APPLICATIONS

This application claims the benefit of U.S. Provisional Application No. 63/619,916, filed Jan. 11, 2024, the entirety of which is incorporated by reference herein.

BACKGROUND OF THE INVENTION

Field of the Invention

The present disclosure relates to an optical element driving mechanism, and more specifically, the present disclosure relates to an optical element driving mechanism for an electronic device.

Description of the Related Art

As the relevant technologies have been developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

An embodiment of the present disclosure provides an optical element driving mechanism. The optical element driving mechanism includes a movable part, a fixed part, and a driving assembly. The movable part is connected to an optical element. The movable part is movable relative to the fixed part. The driving assembly drives the movable part to move along a first direction.

In one embodiment, the optical element driving mechanism further includes a conductive pin assembly including a conductive material. The optical element comprises a conductive material, so that when the optical element is in contact with the conductive pin assembly, the conductive pin assembly forms an electrical circuit to determine a position of the optical element.

BRIEF DESCRIPTION OF THE DRAWINGS

The present disclosure may be more fully understood by reading the subsequent detailed description and examples with references made to the accompanying drawings, wherein.

DETAILED DESCRIPTION OF THE INVENTION

The making and using of optical systems of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms “first”, “second” etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as “first” and “second” may not be used in the description to distinguish different elements. As long as it does not depart from the scope defined by the appended claims, the first element and/or the second element described in the appended claims can be interpreted as any element that meets the description in the specification.

It should be noted that the technical solutions provided by different embodiments below may be interchangeable, combined or mixed to form another embodiment without departing from the spirit of the present disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
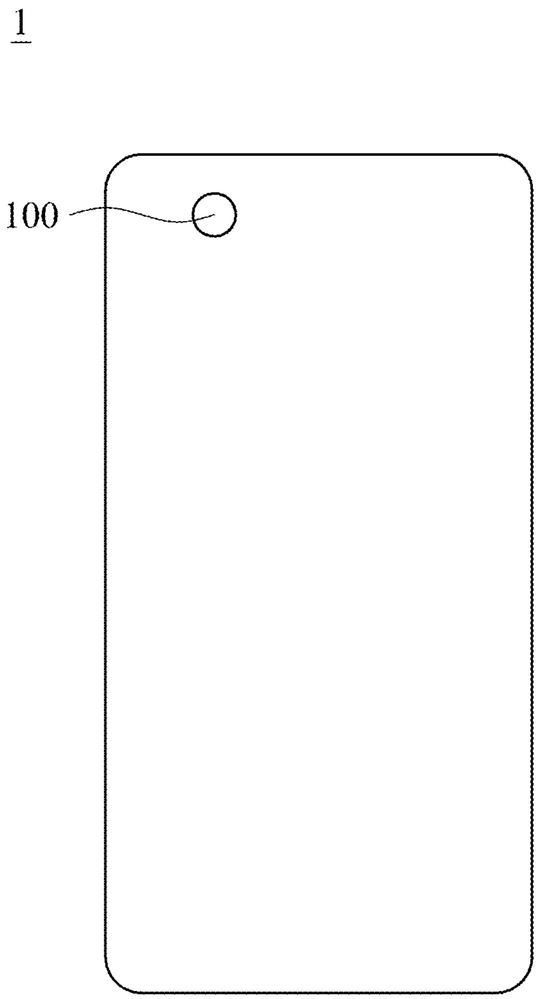
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical system 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical system 100 and the electrical device 1 shown in FIG. 1 are only an example, which is not for limiting the position and the size between the optical system 100 and the electrical device 1. In fact, according to different needs, the optical system 100 may be mounted at different positions in the electrical device 1.

Figure 2:
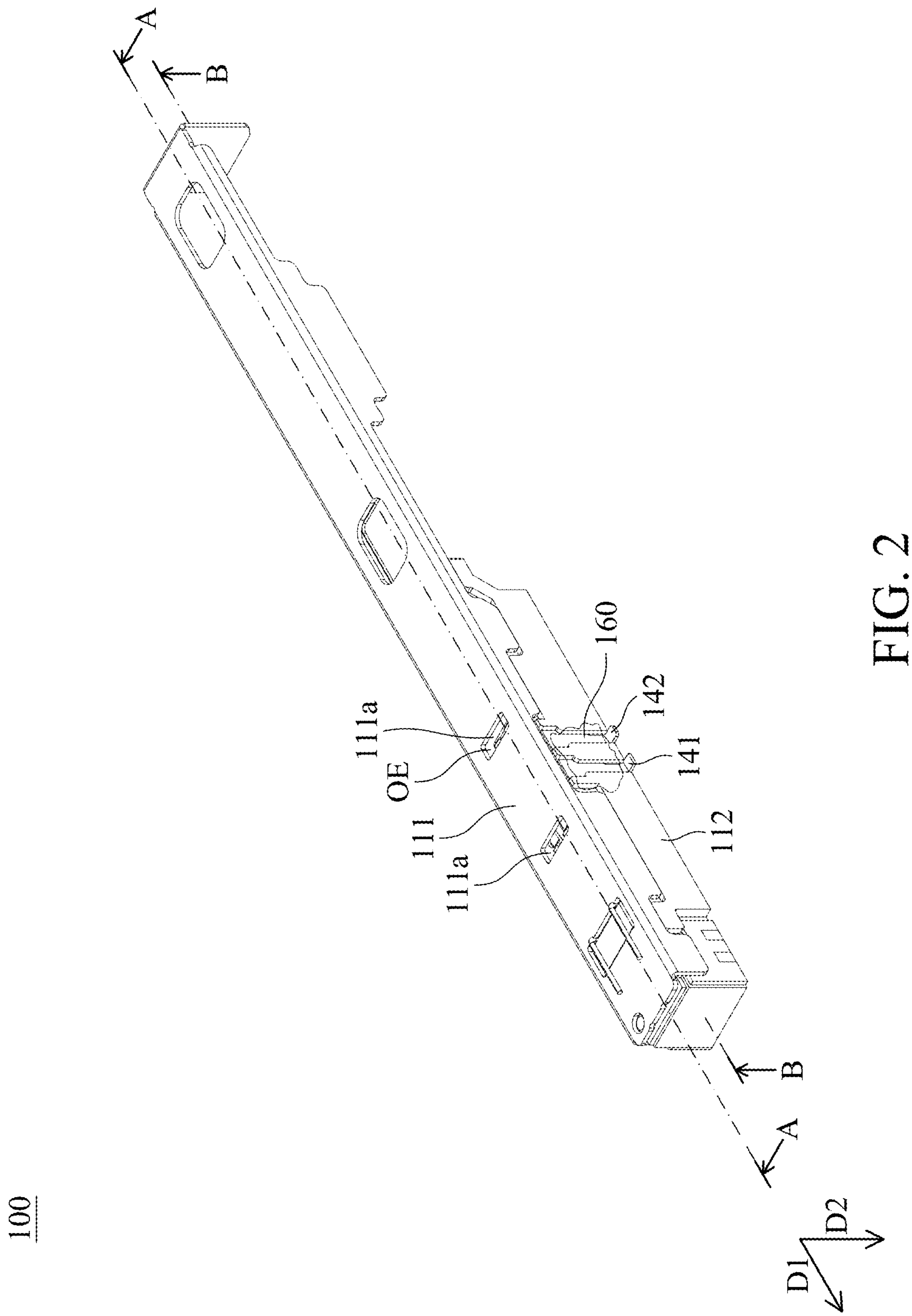
FIG. 2 is a schematic view of the optical element driving mechanism, the first optical element, and the second optical element according to some embodiments of the present disclosure, in which the outer frame is represented by a dotted line.
Figure 3:
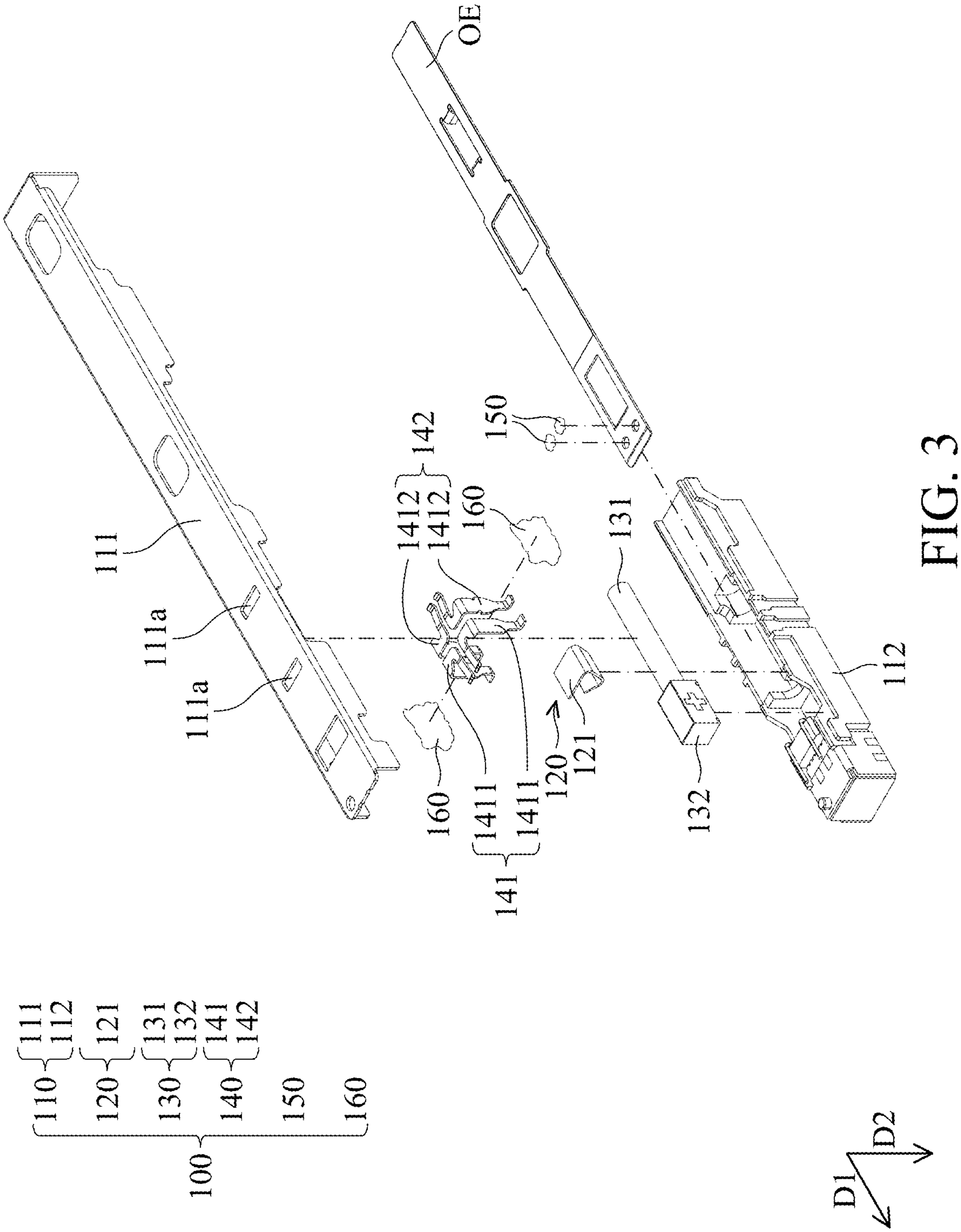
FIG. 3 is an exploded view of the optical element driving mechanism, the first optical element, and the second optical element according to some embodiments of the present disclosure.

Please refer to FIG. 2 and FIG. 3. FIG. 2 is a schematic view of the optical element driving mechanism 100, the first optical element OE1, and the second optical element OE2 according to some embodiments of the present disclosure, in which the outer frame 111 is represented by a dotted line. FIG. 3 is an exploded view of the optical element driving mechanism 100, the first optical element OE1, and the second optical element OE2 according to some embodiments of the present disclosure.

The optical element driving mechanism 100 may include a fixed part 110, a movable part 120, a driving assembly 130, a conductive pin assembly 140, a first connecting element 150, and a second connecting element 160.

The fixed part 110 extends along a first direction D1. The fixed part 110 may include an outer frame 111 and a base 112. The outer frame 111 is disposed on the base 112, and the outer frame 111 and the base 112 may be connected to each other to form an internal space to accommodate other elements of the optical element driving mechanism 100 and the optical element OE.

The movable part 120 may be connected to the optical element OE, and the movable part 120 may move relative to the fixed part 110. For example, the movable part 120 may move along the first direction D1 relative to the fixed part 110, and the optical element OE may move along the first direction D1 with the movable part 120 relative to the fixed part 110.

The first driving assembly 130 may drive the movable part 120 to move relative to the fixed part 110. The first driving assembly 130 may include a piezoelectric element 131 and a driving element 132. The driving element 132 may apply voltage to the piezoelectric element 131 to extend or shorten the piezoelectric element 131, thereby driving the movable part 120 and the optical element OE.

The conductive pin assembly 140 is fixed on the base 112 of the fixed part 110. The conductive pin assembly 140 includes conductive material, and the optical element OE also includes conductive material. Therefore, when the optical element OE is in contact with the conductive pin assembly 140, the conductive pin assembly 140 and the optical element OE form an electrical circuit, thereby a position of the optical element OE is determined.

Figure 4:
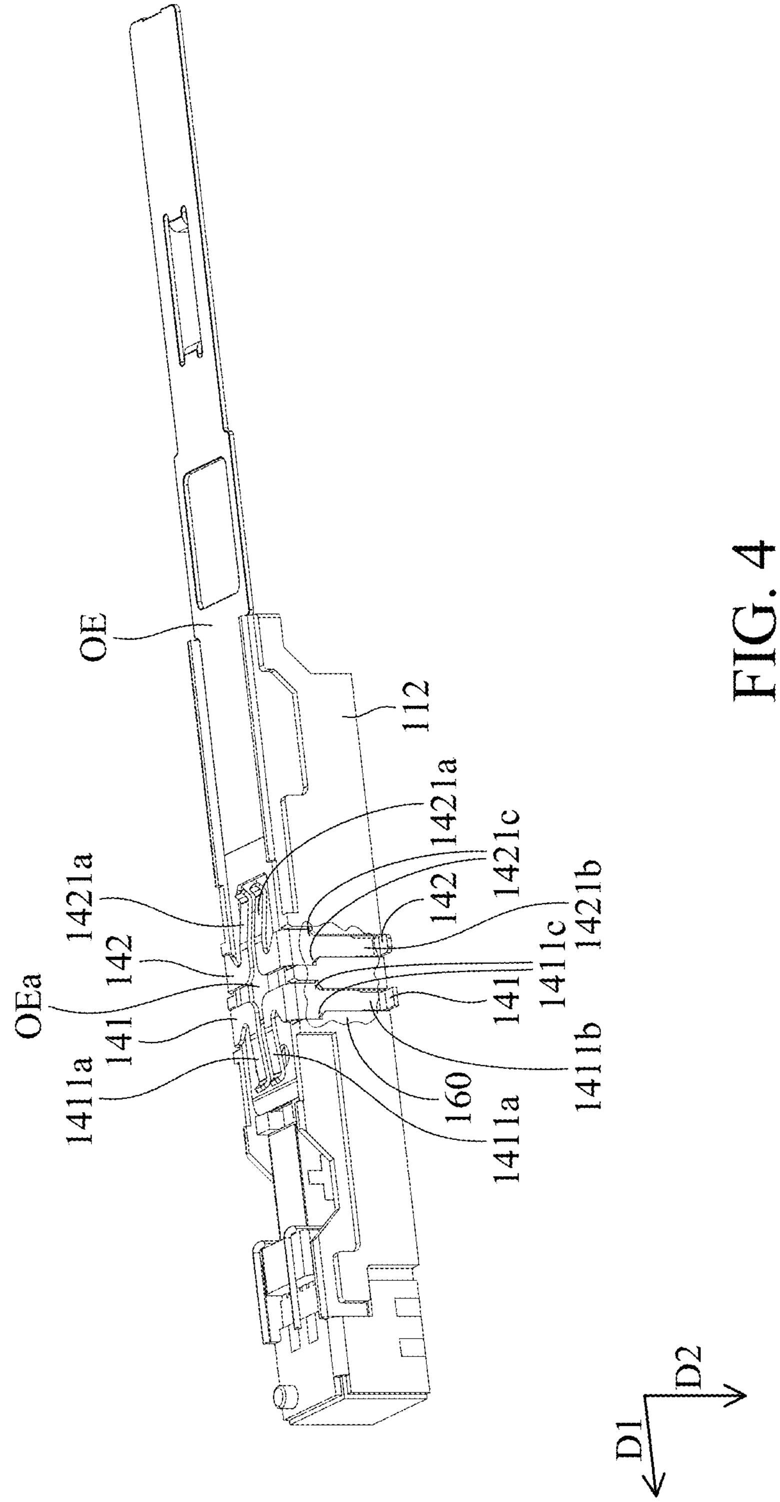
FIG. 4 is a schematic view of the optical element driving mechanism and the optical element according to some embodiments of the present disclosure, in which the outer frame is omitted.

Please refer to FIG. 4. FIG. 4 is a schematic view of the optical element driving mechanism 100 and the optical element OE according to some embodiments of the present disclosure, in which the outer frame 111 is omitted. As shown in FIG. 4, the conductive pin assembly 140 includes a first conductive pin assembly 141 and a second conductive pin assembly 142. The first conductive pin assembly 141 and the second conductive pin assembly 142 are arranged along the first direction D1.

As shown in FIG. 4, the first conductive pin assembly 141 includes two first conductive pins 1411. Each first conductive pin 1411 includes a first conductive pin arm 1411*a*, a first conductive pin foot portion 1411*b*, and a first conductive pin hook portion 1411*c*. The first conductive pin arm 1411*a* is connected to the first conductive pin foot portion 1411*b*, and the first conductive pin hook portion 1411*c* is formed on the first conductive pin foot portion 1411*b*.

The first conductive pin arm 1411*a* has a downward force (preloaded force), so that the first conductive pin arm 1411*a* may tilt downward, so that the first conductive pin arm 1411*a* is not parallel to the fixed part 110. That is, the first conductive pin arm 1411*a* is not parallel to the first direction D1. In detail, an angle may be formed between the first conductive pin arm 1411*a* and the fixed part 110, and the angle may be less than 10 degrees. According to some embodiments of the present disclosure, the angle between the first conductive pin arm 1411*a* and the fixed part 110 is less than 5 degrees.

According to some embodiments of the present disclosure, the downward force (preloaded force) should be between 30% and 50% of the driving force of the driving assembly 130 along the first direction D1 to prevent the optical element OE from being difficult to "push up" the first conductive pin arm 1411*a*, and to prevent from blocking the movement of the movable part 120 and the optical element OE. According to some embodiments of the present disclosure, the downward force (preloaded force) should be less than 30% of the driving force of the driving assembly 130 along the first direction D1.

The first conductive pin foot portion 1411*b* may extend from the first conductive pin arm 1411*a* along a second direction D2 that is perpendicular to the first direction D1, and the first conductive pin foot portion 1411*b* is exposed from the base 112. The first conductive pin hook portion 1411*c* may fix the first conductive pin 1411 to the base 112.

As shown in FIG. 4, the second conductive pin assembly 142 includes two second conductive pins 1421. Each second conductive pin 1421 includes a second conductive pin arm 1421*a*, a second conductive pin foot portion 1421*b*, and a second conductive pin hook portion 1421*c*. The second conductive pin arm 1421*a* is connected to the second conductive pin foot portion 1421*b*, and the second conductive pin hook portion 1421*c* is formed on the second conductive pin foot portion 1421*b*.

The second conductive pin arm 1421*a* has a downward pressure (preloaded force), so that the second conductive pin arm 1421*a* may tilt downward, so that the second conductive pin arm 1421*a* is not parallel to the fixed part 110. That is, the second conductive pin arm 1421*a* is not parallel to the first direction D1. In detail, an angle may be formed between the second conductive pin arm 1421*a* and the fixed part 110, and the angle may be less than 10 degrees. According to some embodiments of the present disclosure, the angle between the second conductive pin arm 1421*a* and the fixed part 110 is less than 5 degrees.

According to some embodiments of the present disclosure, the downward pressure (preloaded force) should be between 30% and 50% of the driving force of the driving assembly 130 along the first direction D1 to prevent the optical element OE from being difficult to "push up" the second conductive pin arm 1421*a*, and to prevent from blocking the movement of the movable part 120 and the optical element OE. According to some embodiments of the present disclosure, the down force (pre-pressure) should be less than 30% of the driving force of the driving assembly 130 along the first direction D1.

The second conductive pin foot portion 1421*b* may extend from the second conductive pin arm 1421*a* along the second direction D2 that is perpendicular to the first direction D1, and the second conductive pin foot portion 1421*b* is exposed from the base 112. The second conductive pin hook portion 1421*c* may fix the second conductive pin 1421 to the base 112.

Please refer to FIG. 4, the extending direction of the first conductive pin arm 1411*a* and the extending direction of the second conductive pin arm 1421*a* may be substantially opposite to each other. For example, the first conductive pin arm 1411*a* and the second conductive pin arm 1421*a* may extend away from each other.

Please continue to refer to FIG. 4. The optical element OE includes an optical element conductive pin opening OEa. The optical element conductive pin opening OEa corresponds to the first conductive pin arm 1411*a* and the second conductive pin arm 1421*a*. Therefore, in some cases (see subsequent description), the first conductive pin arm 1411*a* and the second conductive pin arm 1421*a* may not be in contact with the optical element OE.

In the embodiment of FIG. 4, the optical element OE approaches and "pushes up" the first conductive pin arm 1411*a* (the first conductive pin arm 1411*a* moves along the second direction D2), so that the optical element OE is in contact with the first conductive pin arm 1411*a*. The two first conductive pin arms 1411*a* may be electrically connected to each other through the optical element OE, thereby forming a first electrical circuit. Therefore, when the sensor (not shown) or the controller (not shown) receives the first signal from the first electrical circuit, the optical element OE may be determined to be located at a first position P1 as shown in FIG. 4.

When the optical element OE is located at the first position P1, the optical element conductive pin opening OEa corresponds to the second conductive pin arm 1421*a* (overlapping each other in the second direction D2), so the two second conductive pin arms 1421*a* are not in contact with the optical element OE. Therefore, the two second conductive pin arms 1421*a* do not form an electrical circuit. Therefore, the sensor (not shown) or the controller (not shown) will not receive the signal that says the second conductive pin arm 1421*a* and the optical element OE being electrically connected to each other.

Figure 5:
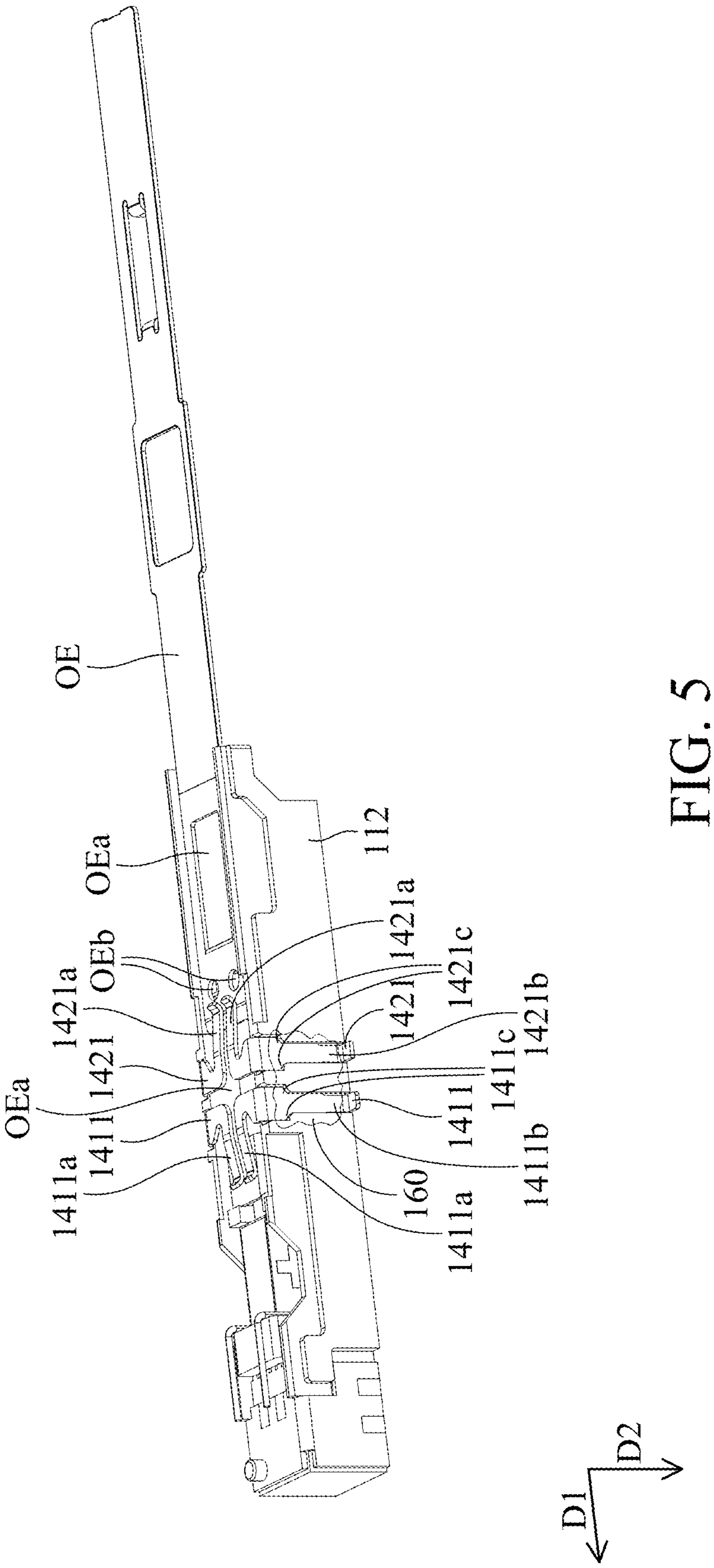
FIG. 5 is a schematic view of the optical element driving mechanism and the optical element according to some embodiments of the present disclosure, in which the outer frame is omitted.

Please refer to FIG. 5. FIG. 5 is a schematic view of the optical element driving mechanism 100 and the optical element OE according to some embodiments of the present disclosure, in which the outer frame 111 is omitted.

In the embodiment of FIG. 5, the optical element OE approaches and "pushes up" the second conductive pin arm 1421*a* (the second conductive pin arm 1421*a* moves along the second direction D2), so that the optical element OE is in contact with the second conductive pin arm 1421*a*. The two second conductive pin arms 1421*a* may be electrically connected to each other through the optical element OE, thereby forming a second electrical circuit. Therefore, when the sensor (not shown) or the controller (not shown) receives the second signal from the second electrical circuit, the optical element OE may be determined to be located at a first position P2 as shown in FIG. 5.

When the optical element OE is located at the second position P2, the two first conductive pin arms 1411*a* are not in contact with the optical element OE. Therefore, the two first conductive pin arms 1411*a* do not form an electrical circuit. Therefore, the sensor (not shown) or the controller (not shown) will not receive the signal says that the first conductive pin arm 1411*a* and the optical element OE being electrically connected to each other.

Please continue to refer to FIG. 5, the first conductive pin hook portion 1411*c* and the second conductive pin hook portion 1421*c* are exposed to the fixed part 110 and the base 112. The second connecting element 160 may cover the first conductive pin hook portion 1411*c* and the second conductive pin hook portion 1421*c* to connect the first conductive pin hook portion 1411*c* and the second conductive pin hook portion 1421*c* to the base 112 of the fixed part 110.

Please refer to FIG. 4 and FIG. 5, specifically, when the optical element OE is in contact with the first conductive pin arm 1411*a* of the conductive pin 141 of the conductive pin assembly 140, the optical element OE is not in contact with the second conductive pin arm 1421*a* of the conductive pin 142 of the conductive pin assembly 140. At this time, the sensor (not shown) or the controller (not shown) will only receive the first signal from the first electrical circuit formed by the first conductive pin arm 1411*a*, but will not receive the second signal. Therefore, it may be determined that the optical element OE is located at the first position P1 as shown in FIG. 4.

However, according to some embodiments of the present disclosure, when the optical element OE is in contact with the first conductive pin arm 1411*a* of the conductive pin 141 of the conductive pin assembly 140, the driving assembly 130 still needs to drive the movable part 120 to move forward (+ direction) in the first direction D1 for a period of time before stopping driving, so as to ensure that the optical element OE is in the first position P1.

When the optical element OE is in contact with the second conductive pin arm 1421*a* of the conductive pin 142 of the conductive pin assembly 140, the optical element OE is not in contact with the first conductive pin arm 1411*a* of the conductive pin 141 of the conductive pin assembly 140. At this time, the sensor (not shown) or the controller (not shown) will only receive the second signal from the second electrical circuit formed by the second conductive pin arm 1421*a*, but will not receive the first signal. Therefore, it may be determined that the optical element OE is located at the second position P2 as shown in FIG. 5.

However, according to some embodiments of the present disclosure, when the optical element OE is in contact with the second conductive pin arm 1421*a* of the conductive pin 142 of the conductive pin assembly 140, the driving assembly 130 still needs to drive the movable part 120 to move reverse (− direction) in the first direction D1 for a period of time before stopping driving, so as to ensure that the optical element OE is in the second position P2.

When the optical element OE is not in contact with the first conductive pin arm 1411*a* of the conductive pin 141 of the conductive pin assembly 140 nor the second conductive pin arm 1421*a* of the conductive pin 142, the driving assembly drives the movable part 120 to move forward or reverse along the first direction D1.

Figure 6:
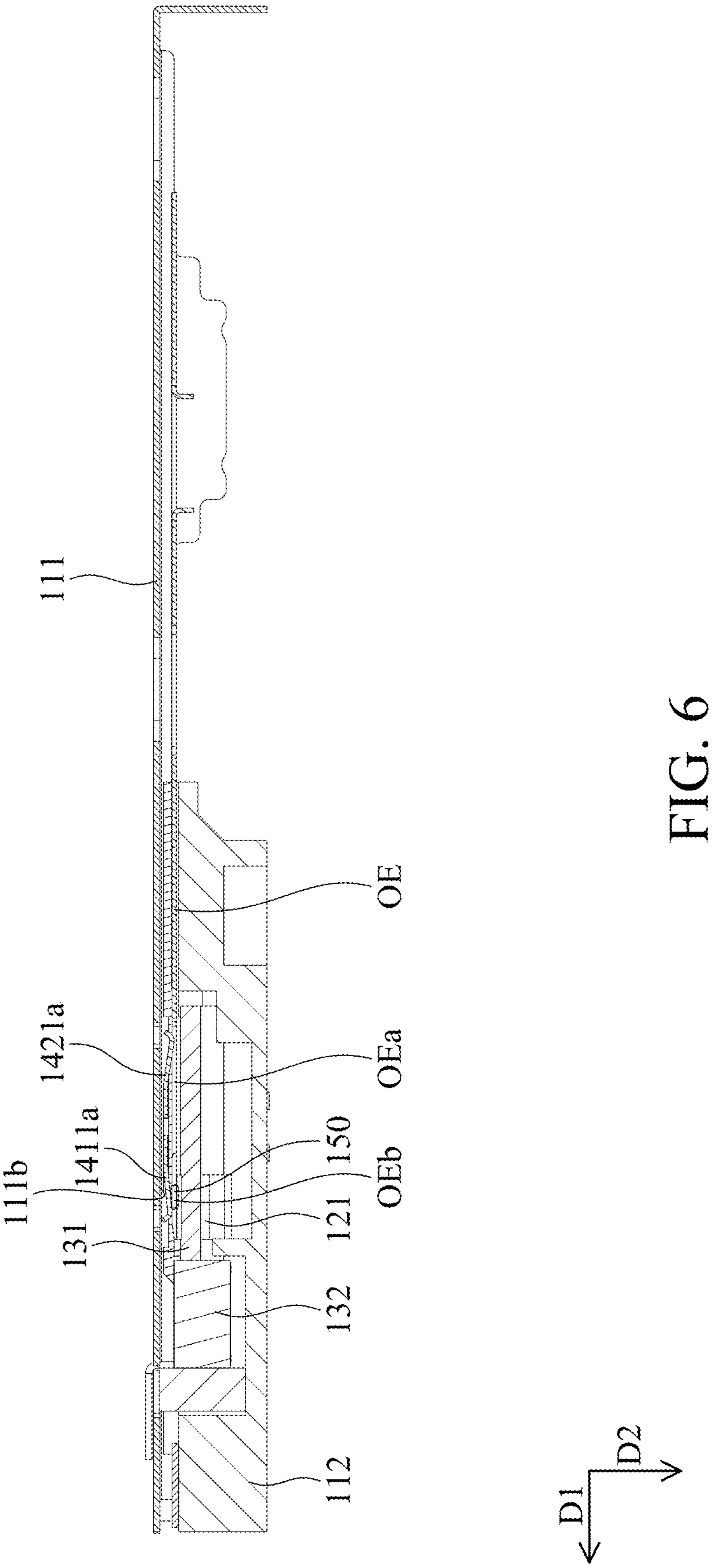
FIG. 6 is a cross-sectional view along line A-A' of FIG. 2 of the optical element driving mechanism and the optical element according to some embodiments of the present disclosure.

Please refer to FIG. 6. FIG. 6 is a cross-sectional view along line A-A' of FIG. 2 of the optical element driving mechanism 100 and the optical element OE according to some embodiments of the present disclosure.

As shown in FIG. 6, the movable part 120 is located between the first conductive pin arm 1411*a* and the second conductive pin arm 1421*a* and the base 112 of the fixed part 110. That is, when assembling the optical element driving mechanism 100, the movable part 120 may be installed first and then installing the conductive pin assembly 140.

The movable part 120 includes a clamping element 121, the clamping element 121 clamps the piezoelectric element 131, and the clamping element 121 fixes the optical element OE to the piezoelectric element 131.

The outer frame 111 includes an outer frame opening 111*a*, the outer frame opening 111*a* corresponding to the conductive pin assembly 140 (e.g., overlapping in the second direction D2). Therefore, the conductive pin assembly 140 is not in contact with the outer frame 111. The outer frame 111 also includes an outer frame surface 111*b*, and the outer frame surface 111*b* faces the conductive pin assembly 140. The outer frame surface 111*b* includes an electrically insulating portion. Therefore, electrical communication between the outer frame 111 and the conductive pin assembly 140 may be effectively avoided.

According to some embodiments of the present disclosure, the conductive pin assembly 140 also includes an electrically insulating portion. For example, in one embodiment, the surfaces of the first conductive pin arm 1411*a* and the second conductive pin arm 1421*a* facing the outer frame surface 111*b* may have electrically insulating portions. For example, in one embodiment, the surfaces of the first conductive pin arm 1411*a* and the second conductive pin arm 1421*a* away from the outer frame surface 111*b* may have electrically insulating portions. However, the portions of the first conductive pin arm 1411*a* and the second conductive pin arm 1411*a* that are in contact with the optical element OE may have electrically insulating portions. Therefore, unwanted electrical communication between the conductive pin assembly 140 and other elements may be effectively avoided.

Please continue to refer to FIG. 6, the optical element OE also includes an optical element connecting opening OEb. The first connecting element 150 fixes the optical element OE to the clamping element 121 of the movable part 120 via the optical element connecting opening OEb. It should be noted that the conductive pin assembly 140 does not extend into the optical element connecting opening OEb; that is, in the first direction D1, the conductive pin assembly 140 does not overlap with the optical element connecting opening OEb.

Figure 7:
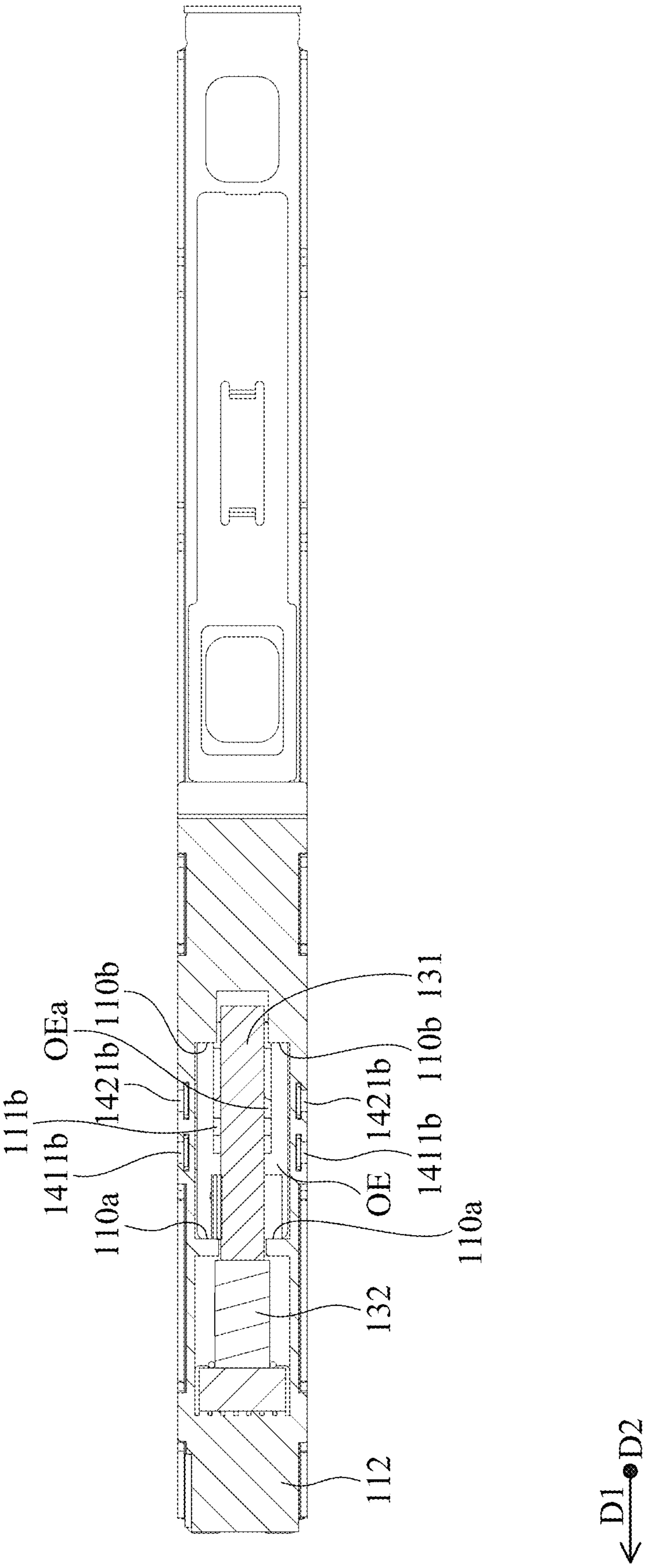
FIG. 7 is a cross-sectional view along line B-B' of FIG. 2 of the optical element driving mechanism and the optical element according to some embodiments of the present disclosure.

Please refer to FIG. 7, FIG. 7 is a cross-sectional view along line B-B' of FIG. 2 of the optical element driving mechanism 100 and the optical element OE according to some embodiments of the present disclosure.

As shown in FIG. 7, the clamping element 121 is located between a first fixed part wall 110*a* and a second fixed part wall 110*b* of the fixed part 110, so as to limit the movement range of the movable part 120.

Figure 8:
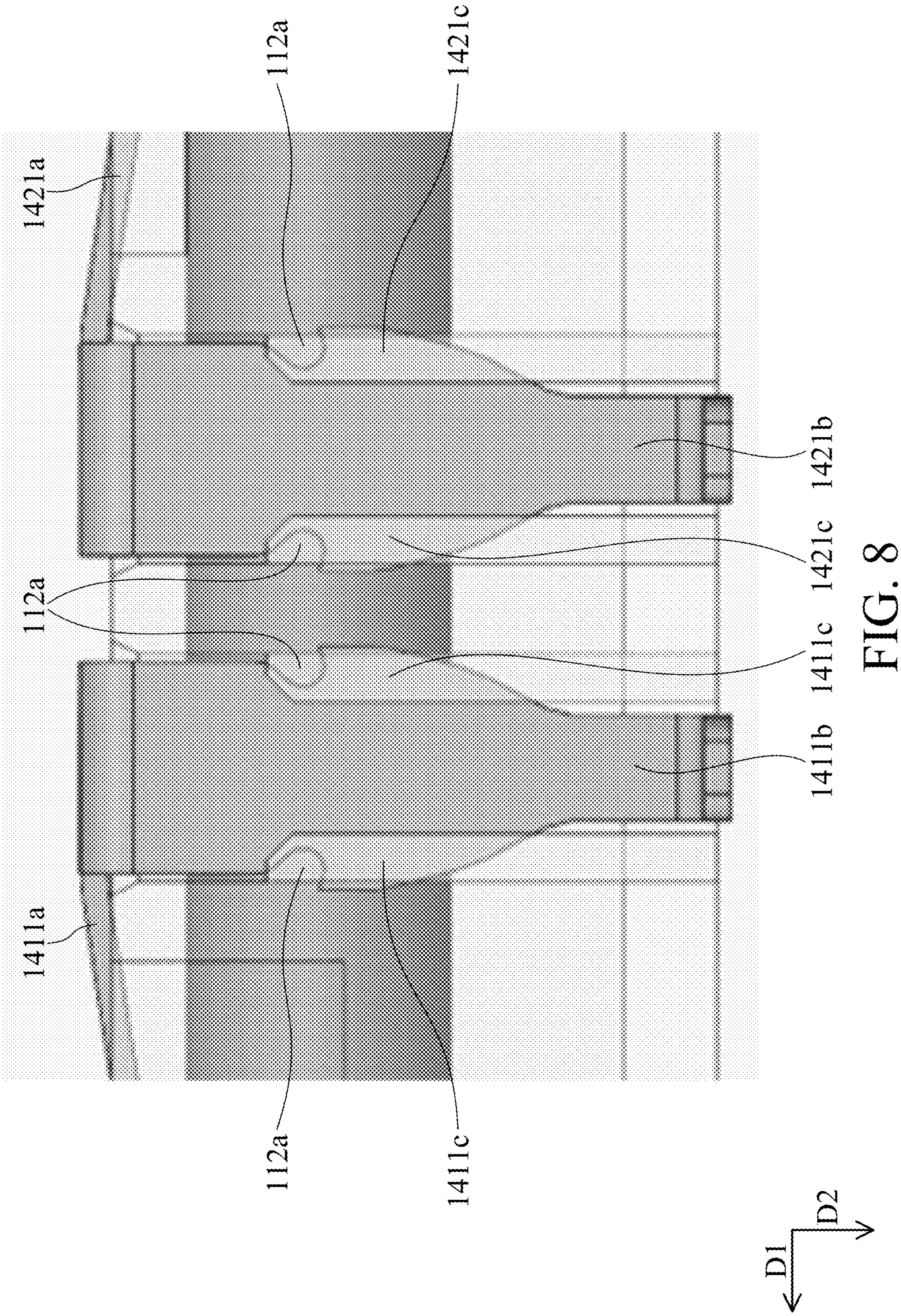
FIG. 8 is a schematic view of a conductive pin foot portion and a conductive pin hook portion according to some embodiments of the present disclosure.

Please refer to FIG. 8, FIG. 8 is a schematic view of a conductive pin foot portion and a conductive pin hook portion according to some embodiments of the present disclosure.

As shown in FIG. 8, the base 112 of the fixed part 110 includes a plurality of hook stopping portions 112*a*. The hook stopping portions 112*a* correspond to the first conductive pin hook portion 1411*c* and the second conductive pin hook portion 1421*c*, so as to connect the first conductive pin hook portion 1411*c* and the second conductive pin hook portion 1421*c* to the base 112 of the fixed part 110.

In summary, since the embodiment of the present disclosure may determine the positions of the movable part 120 and the optical element OE through the conductive pin assembly 140, the optical element driving mechanism 100 of the present disclosure does not need to use a sensing module to sense the positions of the movable part 120 and the optical element OE Therefore, embodiments of the present disclosure may have the advantages of reducing manufacturing costs, reducing the length of the optical element driving mechanism 100 (along the first direction D1), and reducing the thickness of the optical element driving mechanism 100 (along the second direction D2).

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:

a movable part, connected to an optical element;

a fixed part, wherein the movable part is movable relative to the fixed part;

a driving assembly, driving the movable part to move along a first direction; and a conductive pin assembly, comprising a conductive material, wherein, the optical element comprises a conductive material, so that when the optical element is in contact with the conductive pin assembly, the conductive pin assembly forms an electrical circuit to determine a position of the optical element.

2. The optical element driving mechanism as claimed in claim 1, wherein, the conductive pin assembly includes a first conductive pin assembly and a second conductive pin assembly, wherein, when the first conductive pin assembly is in contact with the optical element, the second conductive pin assembly is not in contact with the optical element, wherein, when the second conductive pin assembly is in contact with the optical element, the first conductive pin assembly is not in contact with the optical element.

3. The optical element driving mechanism as claimed in claim 2, wherein, the first conductive pin assembly and the second conductive pin assembly are arranged along the first direction.

4. The optical element driving mechanism as claimed in claim 2, wherein, each of the first conductive pin assembly and the second conductive pin assembly includes two conductive pins, wherein, each of conductive pins includes a conductive pin arm, and each of conductive pin arms is not parallel to the fixed part.

5. The optical element driving mechanism as claimed in claim 4, wherein, an angle between each of conductive pin arms and the fixed part is less than 10 degrees.

6. The optical element driving mechanism as claimed in claim 4, wherein, the movable part is located between the conductive pin arms and a base of the fixed part.

7. The optical element driving mechanism as claimed in claim 4, wherein, each of the conductive pin arms has a downward pressure, and the downward pressure is between 30% and 50% of a driving force of the driving assembly.

8. The optical element driving mechanism as claimed in claim 4, wherein, when the optical element is in contact with the first conductive pin assembly or the second conductive pin assembly, the corresponding conductive pin arms move along a second direction perpendicular to the first direction.

9. The optical element driving mechanism as claimed in claim 1, wherein, when the optical element is not in contact with the conductive pin assembly, the driving assembly drives the movable part to move along the first direction.

10. The optical element driving mechanism as claimed in claim 1, wherein, after the optical element is in contact with the conductive pin assembly, the driving assembly drives the movable part to move along the first direction for a period of time.

11. The optical element driving mechanism as claimed in claim 10, wherein, after the optical element is in contact with the conductive pin assembly and the driving assembly drives the movable part to move along the first direction for the period of time, the driving assembly does not drive the movable part.

12. The optical element driving mechanism as claimed in claim 1, wherein, the fixed part comprises a base and an outer frame, wherein, the conductive pin assembly is fixed on the base, wherein, the outer frame comprises an outer frame opening that is corresponding to the conductive pin assembly, wherein, the conductive pin assembly is not in contact with the outer frame.

13. The optical element driving mechanism as claimed in claim 12, wherein, the outer frame comprises an outer frame surface facing the conductive pin assembly, wherein, the outer frame surface comprises an electrically insulating portion.

14. The optical element driving mechanism as claimed in claim 12, wherein, the conductive pin assembly comprises an electrically insulating portion.

15. The optical element driving mechanism as claimed in claim 1, wherein, the movable part comprises a clamping element to fix the optical element to the driving assembly, wherein, the optical element comprises an optical element connecting opening, wherein, a connecting element fixes the optical element to the clamping element via the optical element connecting opening, wherein, the conductive pin assembly does not extend into the optical element connecting opening.

16. The optical element driving mechanism as claimed in claim 15, wherein, the clamping element is located between a first wall of the fixed part and a second wall of the fixed part to limit a movement range of the movable part.

17. The optical element driving mechanism as claimed in claim 1, wherein, the conductive pin assembly comprises a plurality of conductive pins, wherein, each of the conductive pins comprises a conductive pin hook portion configured to fix the conductive pins to the fixed part.

18. The optical element driving mechanism as claimed in claim 17, wherein, the conductive pin hook portions are exposed on the fixed part, wherein, a connecting element covers the conductive pin hook portions to connect the conductive pin hook portions to the fixed part.

19. The optical element driving mechanism as claimed in claim 17, wherein, the fixed part comprises a plurality of hook stopping portions, wherein, the hook stopping portions correspond to the conductive pin hook portions to connect the conductive pin hook portions to the fixed part.

* * * * *